United States Patent [19]

Moake

[11] Patent Number: 5,627,368

[45] Date of Patent: May 6, 1997

[54] FOUR-DETECTOR FORMATION-DENSITY TOOL FOR USE IN CASED AND OPEN HOLES

[75] Inventor: Gordon L. Moake, Houston, Tex.

[73] Assignee: Gas Research Institute, Chicago, Ill.

[21] Appl. No.: 498,069

[22] Filed: Jul. 5, 1995

[51] Int. Cl.$^6$ .................................................. G01V 5/12
[52] U.S. Cl. ....................................... 250/269.3; 250/266
[58] Field of Search ................................. 250/269.3, 264, 250/265, 266

[56] References Cited

U.S. PATENT DOCUMENTS

| | | | |
|---|---|---|---|
| 4,129,777 | 12/1978 | Wahl et al. | 250/266 |
| 4,685,092 | 8/1987 | Dumont . | |
| 5,081,391 | 1/1992 | Owen . | |
| 5,089,989 | 2/1992 | Schmidt et al. . | |
| 5,377,160 | 12/1994 | Tello et al. . | |
| 5,390,115 | 2/1995 | Case et al. | 250/266 |
| 5,530,243 | 6/1996 | Mathis | 250/269.3 |

Primary Examiner—Carolyn E. Fields
Attorney, Agent, or Firm—Hill, Steadman & Simpson

[57] ABSTRACT

An improved formation density logging tool is provided that is effective in cased holes. The improved tool utilizes four detectors which generate four signals enabling the operator to calculate the four unknown variables of interest: formation density, cement thickness, cement density and casing thickness. By providing a means for calculating cement thickness, cement density and casing thickness, a more accurate calculation of formation density is provided. Further, by providing a means for calculating cement thickness, cement density and casing thickness, a more accurate neutron-porosity measurement can be made when the density tool is used in combination with a neutron tool. The tool comprises improvement over currently-available two-detector density tools which are normally useful only in open holes. It is anticipated that the tool provided herein will be useful in both open and cased holes; it is also anticipated that the casing thickness and cement thickness calculations of the tool will be used to enhance the porosity calculation of neutron-porosity tools.

29 Claims, 2 Drawing Sheets

FOUR-DETECTOR FORMATION-DENSITY TOOL FOR USE IN CASED AND OPEN HOLES

FIELD OF THE INVENTION

This invention relates generally to oil and gas well logging tools. More particularly, this invention relates tools for measuring rock formation density through the use of gamma rays. Still more particularly, this invention relates to an improved density tool that may be used in cased holes as well as open holes.

BACKGROUND AND SUMMARY OF THE INVENTION

Logging tools for measuring the formation density in open holes are well known. Currently-available "open-hole" density logging tools normally include a gamma ray source, typically cesium-137, and two detectors—a near detector and a far detector. Open-hole density tools have two detectors to compensate for mudcake (i.e. a layer of solid material consolidated from drilling fluid that normally lines an open borehole) and standoff (i.e. the distance between the tool and the side of the borehole). Gamma rays are continuously emitted from the source and propagate out through the mudcake and into the formation. The electron density of the formation is calculated based on the count rate or intensity of the gamma rays that are received at the detectors after passing through the mudcake and formation.

In addition to employing radioactive sources for gamma rays, it is anticipated that density tools will employ accelerators, or more specifically electron accelerators, as gamma ray sources even though such accelerators are not currently available. In tools employing accelerators, the detectors will not necessarily detect and/or calculate gamma ray count rates because most accelerator designs generate relatively huge amounts of gamma rays for brief, intermittent periods of time resulting in large quantities of gamma rays engaging the detectors within a relatively short period of time. Therefore, it may be more feasible to detect and measure the intensities of the gamma rays rather than the count rate or the rate at which gamma rays engage the detectors. The detectors would generate voltage signals proportional to the intensities of the detected gamma rays as opposed to count rate signals.

In general, a layer of mudcake exists along the outer periphery of the borehole. The intensity signals from the near and far detectors are combined to provide a measure of the formation density that is essentially independent of this mudcake if the thickness of the mudcake is within a limited range. This is possible when the spacings and collimations chosen for the two detectors result in substantially different sensitivities to the mudcake and formation. The thickness of the mudcake that can be compensated for is limited by the spacing between the near detector and the gamma ray source and by the collimation of the near detector. A longer spacing between the gamma ray source and the near detector enables more mudcake to be penetrated by the gamma rays and therefore enables the tool to compensate for thicker mudcake. However, greater spacings between the gamma ray source and the near detector reduce the contrast between the near and far detector sensitivities to mudcake and the formation, thereby reducing the quality of the density measurement.

The two-detector density logging tools discussed above are limited in their use in that they are unable to provide an accurate formation density when used in a cased hole. Specifically, while the currently-available two detector density tools can compensate for mudcake, they are unable to compensate for the casing and cement and are therefore unable to accurately calculate the formation density in a cased hole.

The gamma ray detectors consist of sodium iodide crystals connected to photomultiplier tubes. These devices are commercially available and well known in the art. When gamma rays interact in the sodium iodide crystal, they produce light which is converted by the photomultiplier tube into an electronic signal. These signals are amplified to produce voltage pulses that are proportional to the energy deposited in the crystal. These voltage pulses may be counted to determine the gross number of gamma rays detected per second or they may be sorted by amplitude to determine the number of gamma rays detected per second in various energy ranges. The later technique is common in open-hole logging, as described in the paper "A New Approach to Determining Compensated Density and $P_e$ Values with a Spectra-Density Tool", presented by G. L. Moake at the Annual SPWLA Logging Symposium in Midland, Jun. 16–19, 1991.

Typical two detector density tools are decentralized within the borehole by a bowspring or caliper device so that the detectors and the source are pushed up against the side of the borehole. The decentralization of the tool against the side of the borehole substantially precludes the gamma rays from propagating upward through the drilling fluid and therefore the effect of the drilling fluid on the density measurement is minimized.

However, as noted above, the two detector density tools cannot adequately function in cased holes because they are unable to compensate for the casing and the cement. In short, too many variables are present in order to accurately calculate the formation density. Specifically, in order to probe the formation, the gamma rays must exit the tool, pass through the casing and cement and scatter in the formation before passing back through the cement and the casing to finally reenter the tool to be detected. Thus, instead of just a mudcake correction as in the case of open holes, a cased hole density tool must be able to correct or compensate for the cement and casing which are both more formidable a correction than a layer of mudcake because of the relatively high densities of metal casing and thick amounts of cement (i.e. gamma rays pass through a layer of mudcake more easily than typical casing and a layer of cement before reaching the near detector).

Occasionally, open hole density tools are used to run cased hole density logs. The information provided by open hole density tools in cased holes is accurate in only a limited number of cases, primarily when the cement thickness is quite small or no cement is present. This can occur on the low side of deviated wells where the casing may very well be resting against bare formation or only a small amount of cement will be disposed behind a casing. Typically, open hole density tools employ a gamma source in the form of contained cesium-137 which produces 0.662 MeV gamma rays. The amount of cement that can be corrected for is limited by the near or "first" detector. Typically, these near detectors can correct for only about 0.75 inches of mudcake in an open hole and therefore it is easy to see why these tools are ineffective in compensating for steel casing, which is normally 0.36 to 0.50 inches thick in combination with a layer of cement disposed behind the casing. In any event, even dangerously thin casing is much denser, and therefore more effective at blocking the passage of gamma rays, than mudcake.

As the gamma rays pass through the casing, cement and formation, they are scattered and absorbed by these materials. The primary scattering interaction is called Compton scattering and is caused by electrons in the casing, cement and formation. Compton scattering tends to reduce the energy of the gamma rays that are scattered until their energy is so low that the gamma rays are absorbed by electrons through an interaction called photoelectric absorption. Thus, if the density of electrons in the casing, cement and formation is high, fewer electrons will make it back through the formation, cement and casing to be detected at the tool. In short, the number of detected gamma rays varies inversely to the density of electrons in the various materials through which the gamma rays must pass. Since the density of electrons is directly related to the density of the material being measured, the number of detected gamma rays will also depend strongly on the density of the casing, the density of the cement and the density of the formation.

Two other physical processes that dominate the scattering and absorption of gamma rays are known as coherent scattering and photoelectric absorption, both of which are highly dependent upon the composition of the material. Those skilled in the art commonly represent the strength or effect of the coherent scattering and photoelectric absorption interactions relative to the strength of Compton scattering with the variable $P_e$. For purposes of this invention, $P_e$ will therefore be defined as the strength or effect of the coherent scattering and photoelectric absorption interactions relative to the strength of the Compton scattering. Thus, the amount of gamma rays detected at the tool will also depend on the $P_e$ of the casing, the $P_e$ of the cement and the $P_e$ of the formation. Of course, the detected gamma rays will also depend on the thickness of the casing and the thickness of the cement.

As stated above, the performance of the tool will also depend slightly upon the density of the borehole fluid. However, density tools are commonly decentralized in the borehole, meaning that the tool, including the source and detectors is pushed up against the side of the borehole. In that manner, there is very little borehole fluid through which the gamma rays must pass in order to be detected at the tool. Further, since the borehole fluid properties are usually known and in any event can be tested at the surface, small correction factors based on the knowledge of the borehole fluid properties can be easily utilized.

Accordingly, there are eight variables that affect the response of the tool: the density of the casing ($\rho_s$); the thickness of the casing ($t_s$); the $P_e$ of the casing; the density of the cement ($\rho_c$); the $P_e$ of the cement; the thickness of the cement ($t_c$); the formation density ($\rho_f$); and the $P_e$ of the formation. However, all but four independent variables can be accounted for prior to measurement.

First, casings tend to be made of the same material, namely carbon steel. Therefore, casings tend to have about the same density ($\rho_s$) and $P_e$. Thus the density ($\rho_s$) and $P_e$ of the casing are known and the thickness ($t_s$) of the casing is unknown.

Second, the $P_e$ of most cements is a negligible value because the low energy gamma rays that are sensitive to the $P_e$ of the cement are blocked by photoelectric absorption that occurs within the casing. Accordingly, only the density ($\rho_c$) and thickness ($t_c$) of the cement are important and unknown.

Further, the $P_e$ of the formation can also be neglected because $P_e$, is a much lower value for high energy gamma rays than for low energy gamma rays. In other words, the effect of coherent scattering and photoelectric absorption is very low for high energy gamma rays; in contrast, the effect of coherent scattering and photoelectric absorption is relatively significant for low energy gamma rays. However, any gamma rays that become low energy gamma rays in the formation are unlikely to penetrate the cement and casing before being detected by the tool. Thus, the measured intensity at the tool will not depend significantly on the $P_e$ of the formation. Thus, the density ($\rho_f$) of the formation remains unknown.

Therefore, in light of the above, there are only four independent variables that significantly affect the measured intensities: the density of the formation ($\rho_f$); the thickness of the cement ($t_c$); the density of the cement ($\rho_c$); and the thickness of the casing ($t_s$). Because there are four unknown variables, four independent intensities must be measured in order to determine the formation density in a cased hole. Further, assuming a casing density ($\rho_s$), one can also calculate the casing thickness ($t_s$), cement thickness ($t_c$) and cement density ($\rho_c$).

Accordingly, it would be highly desirable to provide a density logging tool with at least four detectors that would be capable of measuring the formation density in a cased hole as well as cement thickness, cement density and casing thickness. An effective cased hole density logging tool in combination with already existing cased hole neutron logging tools would provide an effective means for finding additional gas reserves behind existing cased holes. Further, an effective cased hole density tool would also provide important information regarding formation evaluation behind the casing. It is also contemplated that an improved cased hole density logging tool could also prove useful in open holes.

Still further, it is anticipated that an improved four-detector cased hole density logging tool will also improve the porosity measurement generated by neutron tools used in combination with a cased hole density logging tool. Specifically, in cased holes, the casing thickness, cement thickness and cement density are often estimated and assumed to be constant. However, neutron tools are very sensitive to casing thickness, cement thickness and cement density. Hence, assuming these variables to be constant and assigning a value to these variables can often result in significant errors in the neutron-porosity measurement. Therefore, when using an improved cased hole density tool in combination with a neutron-porosity tool, an operator can measure casing thickness, cement thickness and cement density and use these measured values to improve the neutron-porosity measurement.

Typical neutron-porosity tools consist of a neutron source and two neutron detectors. One detector is positioned closer to the source than the other. Each detector produces one count rate, which is indicative of the number of neutrons per second that pass through it. The tool is designed so that the bulk of the neutrons that reach the detectors have passed through the formation, where some of them are scattered and absorbed. The number of neutrons that ultimately reach the detectors depends strongly on the amount of hydrogen in the formation. When the formation contains water or oil in its pore spaces, the hydrogen content is strongly dependent on the porosity of the formation. Thus, an algorithm is used to convert the measured count rates to an estimate of formation porosity.

This algorithm usually requires the borehole diameter as an input. If not available, a constant value is assumed. The final answer is very sensitive to the diameter value that is used, so it is important to have an accurate estimate of it. The tool response is also very sensitive to the distance from the tool to the formation wall. During logging, the tool is pushed as close as possible to the borehole wall, since significant errors may occur if the tool is not flush against the wall. However, corrections can be made to the porosity estimate if the distance between the tool and wall is known.

In a cased hole, the neutron tool is pushed against the casing wall, but it cannot be pushed against the formation wall because of the presence of the casing and cement. Since the tools that measure borehole diameters in open holes do not work in cased holes, an estimate of the borehole diameter must be made. Since boreholes are generally rugose and have a varying diameter, the value assigned to the diameter will often be sufficiently incorrect to cause significant errors. This problem could be alleviated if a dynamically-varying measure of the borehole diameter were available. Since the tool is not pushed against the wall, its measurements will also be affected by the casing and cement. Since there was previously no way to measure the casing thickness and cement thickness, an estimate of these values was made. However, the amount of cement between the tool and formation will often be sufficiently incorrect to cause significant errors. This problem could be alleviated if a dynamically-varying measure of the cement thickness were available. Also, if the casing thickness is not accurately known, either because of erosion or missing records, errors will occur. Again, a dynamically-varying measure of the casing thickness would solve that problem.

An improved tool for measuring formation density in cased or open holes is provided in the form of a housing that accommodates a gamma ray source and at least four detectors. The gamma ray source is spaced axially from the first, second, third and fourth detectors. The first or near detector is axially spaced from the gamma ray source by a distance defined as a first spacing. The first spacing and collimation for the first detector are designed so that the gamma rays detected at the first detector are those gamma rays that are scattered primarily by the casing. In short, the first detector primarily detects or preferentially detects gamma rays scattered through the casing.

A second or near-middle detector is spaced axially farther away from gamma ray source than the near detector. The near-middle detector is spaced from the gamma ray source by a distance defined as a second spacing. The second spacing and collimation for the near-middle detector are designed so that the gamma rays detected at the near-middle detector will be those that are primarily scattered by the casing and shallow portions of the cement or the portion of cement adjacent to the casing.

A third or far-middle detector is spaced actually farther away from the gamma ray source than the near and near-middle detectors. The far-middle detector is spaced from the gamma ray source by a distance defined as a third spacing. The third spacing and collimation for the far-middle detector are designed so that gamma rays detected by the far-middle detector will be those that are primarily scattered by the casing, cement and formation. The far-middle detector will be more sensitive to those gamma rays scattered by the deep portion of the cement or the portion of the cement adjacent to the formation.

Finally, a fourth or far detector is spaced axially farther away from the gamma ray source than the near, near-middle and far-middle detectors by a distance defined as a fourth spacing. The fourth spacing and collimation defined by the far detector are designed so that the gamma rays detected at the far detector are those primarily scattered from the casing, cement and formation.

Preferably, the detectors are shielded by a high density material that prevents detection of gamma rays that are simply travelling up through the tool. A pathway or void in the shielding is provided in the form of a collimation channel which extends from the detector through the tool and terminates at the outside surface of the tool. The collimation channels are specifically designed for the purpose of each detector. Specifically, the near or first detector will have a collimation that is directed at a steep angle with respect to the casing so that the first detector will detect gamma rays that are scattered through all of the casing. The second or near-middle detector will have a collimation that is directed at a shallower angle with respect to the casing because the near-middle detector is intended to detect gamma rays scattered through the shallow portion of the cement as well as the casing. The third or far-middle detector will have a collimation directed at an angle so that the far-middle detector will detect gamma rays scattered through the casing, the deeper portion of the cement as well as a shallow portion of the formation. Finally, the fourth or far detector will have a wide collimation channel which is directed substantially perpendicular to the casing due to the distance of the far detector from the source. Because gamma rays detected at the far detector must pass through the casing, cement, and deep into the formation before passing back through the cement and casing, the statistical probability of this event happening is smaller than for the first and second detectors and therefore a wider collimation channel is required for the far detector.

It is also anticipated that a high energy gamma ray source such as cobalt 60 which provides 1.173 and 1.333 MeV gamma rays will be utilized. Other gamma ray sources, such as cesium-137 which provides only 0.662 MeV gamma rays or accelerator sources such as an electron accelerator could also be used. However, the spacing between the third or fourth detector and the gamma ray source will be longer than the conventional spacing between the gamma ray source and far detector in a open hole tool and therefore a source which emits higher energy gamma rays (i.e., 1.173 and 1.333 MeV) will provide a higher intensity at the far detector.

The present invention also lends itself to an improved method of measuring formation density behind casing as well as cement thickness and casing thickness. Specifically, the casing, cement and formation are irradiated with gamma rays. Gamma rays are detected at a first detector spaced a first axial distance from the gamma ray source. A first intensity is calculated for the first detector. Gamma rays are also detected at a second detector disposed a second axial distance from the gamma ray source. The second detector being disposed farther from the source than the first detector. A second intensity is calculated for the second detector. Gamma rays are also detected at a third detector spaced a third axial distance from the gamma ray source. The third detector is spaced farther from the source than both the first and second detectors. A third intensity is calculated for the third detector. Gamma rays are also detected at a fourth detector spaced a fourth axial distance from the gamma ray source. The fourth detector is spaced farther from the source than the first, second and third detectors. A fourth intensity is calculated for the fourth detector. An estimated formation density, cement thickness, cement density and casing thickness is then calculated based on the first, second, third and fourth intensity signals and by assuming constant values for the density and $P_e$ of the casing, negligible values for the $P_e$ of the cement and the $P_e$ of the formation and using a correction factor for the borehole fluid.

It is therefore an object of the present invention to provide an improved formation density tool for use in cased holes.

Another object of the present invention is to provide a logging tool which is capable of measuring formation density while compensating for the effects of casing and cement.

Another object of the present invention is to provide a novel four detector formation density tool.

Another object of the present invention is to provide an improved method for measuring formation density behind casing and cement.

Another object of the present invention is to provide an improved gamma ray density tool capable of measuring cement thickness, casing thickness and cement density.

Still another object of the present invention is to improve the porosity measurement of a neutron-porosity tool in a cased hole by providing accurate values for casing thickness and cement thickness.

Yet another object of the present invention is to provide an improved formation density tool that may be used in both open and cased holes and in combination with neutron-porosity tools.

Other features and advances of the present invention will appear in the following description in which one embodiment has been set forth in detail in conjunction with the accompanying drawings.

BRIEF DESCRIPTION OF THE DRAWINGS

This invention is illustrated more or less diagrammatically in the accompanying drawings, wherein.

Figure 1:
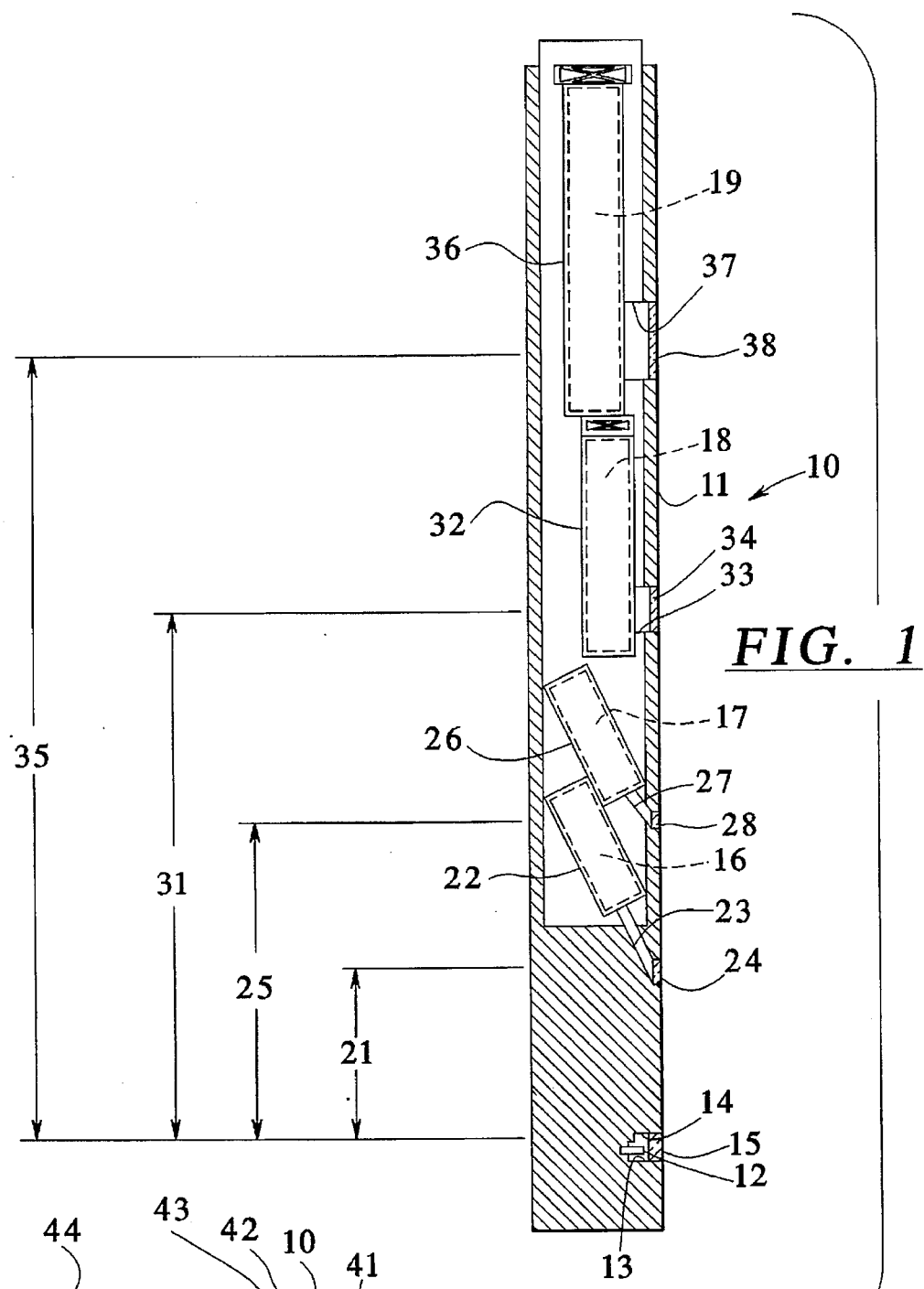
FIG. 1 is a schematic diagram of a formation density tool designed in accordance with the present invention.

It should be understood that the drawings are not to scale and that the embodiments are illustrated by graphic symbols and diagrammatic representations. Details which are not necessary for an understanding of the present invention or which render other details difficult to perceive have been omitted. It should be understood, of course, that the invention is not necessarily limited to the particular embodiments illustrated herein.

DETAILED DESCRIPTION OF THE DRAWINGS

Like reference numerals will be used to refer to like or similar parts from Figure to Figure in the following description of the drawings.

The dramatic improvement contributed by the present invention is best understood after consideration of currently-available open hole density tools. Specifically, these tools include only two detectors, a near detector and a far detector. The near detector allows the tool to compensate for mudcake disposed along the periphery of the borehole while the far detector, in combination with the near detector, enables the tool to measure the formation density. These tools are incapable of measuring formation density in a cased hole because two detectors don't generate enough information to compensate for casing and cement and further because the gamma rays do not travel far enough outward from the tool and into the formation before being detected at the far detector. Two-detector open-hole density tools are useful for measuring formation density behind casing only in special situations (e.g. when no cement is present).

Turning to FIG. 1, a four-detector formation density tool 10 is provided. The tool 10 features a housing 11 which may be composed of tungsten. Tungsten is a suitable material because it is strong and hard. Tungsten provides excellent shielding for gamma rays. Low density windows disposed immediately in front of the detectors are used so that the gamma rays may enter the tool at the desired location. Alternative materials for the housing include titanium and steel. If titanium is used, low density windows are not necessary but additional shielding may be required inside the housing.

The gamma ray source 12 may be cobalt-60 which produces 1.173 and 1.333 MeV gamma rays. Cesium-137 and accelerator sources may also be utilized. The source 12 is disposed within a source cavity 13. A collimator 14 directs the gamma rays outward in a general direction. Because the tool 10 is normally operated in a decentralized position (see FIG. 2), the end of the collimator 14 or the source window 15 will normally be abutting against the inside surface of the casing during operation of the tool. The source cavity 13 may also be surrounded with a high-density shielding material such as tungsten which helps prevent gamma rays from proceeding directly upward toward the detectors 16, 17, 18, 19.

The first or near detector 16 is disposed from the source 12 by a pre-determined distance referred to as the first spacing 21. The near detector 16 is accommodated in a compartment 22. A collimation channel 23 serves as a passageway between the detector 16 and the housing 11. A low density window 24 is also provided. The combination of the collimation channel or collimator 23 and window 24 and the specific angle of the collimator 23 enables gamma rays that have been scattered primarily by the casing to reach the first detector 16.

In contrast, the second or near-middle detector 17 is disposed axially from the source 12 by a second spacing 25. The near-middle detector 17 is also contained within a compartment 26. A collimation channel 27 extends between the outer surface of the housing 11 and the near-middle detector 17. The second collimator 27 terminates at a second window 28. The second window 28 and second collimator 27 permit gamma rays that are scattered primarily by the casing and shallow portions of the cement to proceed up through the collimator 27 to the near-middle detector 17. Therefore, the near-middle detector 17 preferentially detects gamma rays that are emitted from the source 12 and then subsequently passed through the casing and shallow portions of the cement adjacent to the casing before they proceed up the channel 27 to the second detector 17.

The third or far-middle detector 18 is disposed axially from the source 12 by a third spacing 31. The far-middle detector 18 is also contained within a compartment 32 that may be surrounded with a high-density material such as tungsten which defines a collimation channel 33 that extends between the outer surface of the housing 11 and the far-middle detector 18. The third collimation channel 33 terminates at a third window 34. The third window 34 and third collimation channel 33 permit gamma rays that are scattered primarily by the casing, the cement and shallow portions of the formation (i.e. that portion of the formation adjacent to the cement) to proceed up through the channel 33 to the far-middle detector 18. Therefore, the far-middle detector 18 preferentially detects gamma rays that are emitted from the source 12 and then subsequently passed up through the casing, the cement and shallow portions of the formation before they proceed up the collimation channel 33 to the far-middle detector 18.

The fourth or far detector 19 is disposed yet even farther than the third detector 18 at a fourth spacing 35 above the source 12. It will be noted that the far detector 19 may also be encased in a compartment 36 which is layered with a high-density material which defines a collimator 37. The collimator 37 and window 38 are substantially wider than the first, second and third collimators 23, 27, 33 and the first, second and third windows 24, 28, 34. This is because the far detector 19 is intended to detect gamma rays being scattered by the formation. The width of the collimation channel 37 is necessary to collect a reasonable number of gamma rays. Further, the perpendicular relationship between the collimator 37 and the longitudinal axis of the borehole (not shown) effectively blocks gamma rays that travel up the borehole from reaching the far detector 19.

While the tool 10 of FIG. 1 utilizes four detectors 16, 17, 18, 19 that are disposed above the source 12, it will be recognized that the detectors 16, 17, 18, 19 could easily be disposed below the source 12 and still fall within the scope of the present invention. Additionally, detectors could be placed above and below the source.

Figure 2:
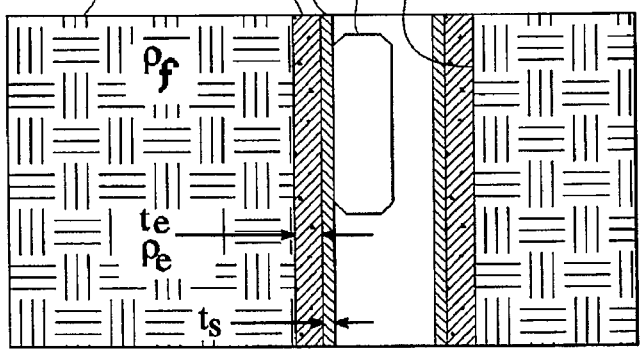
FIG. 2 is a general illustration of a formation density tool showing a tool in a decentralized position within a cased borehole.
Figure 3:
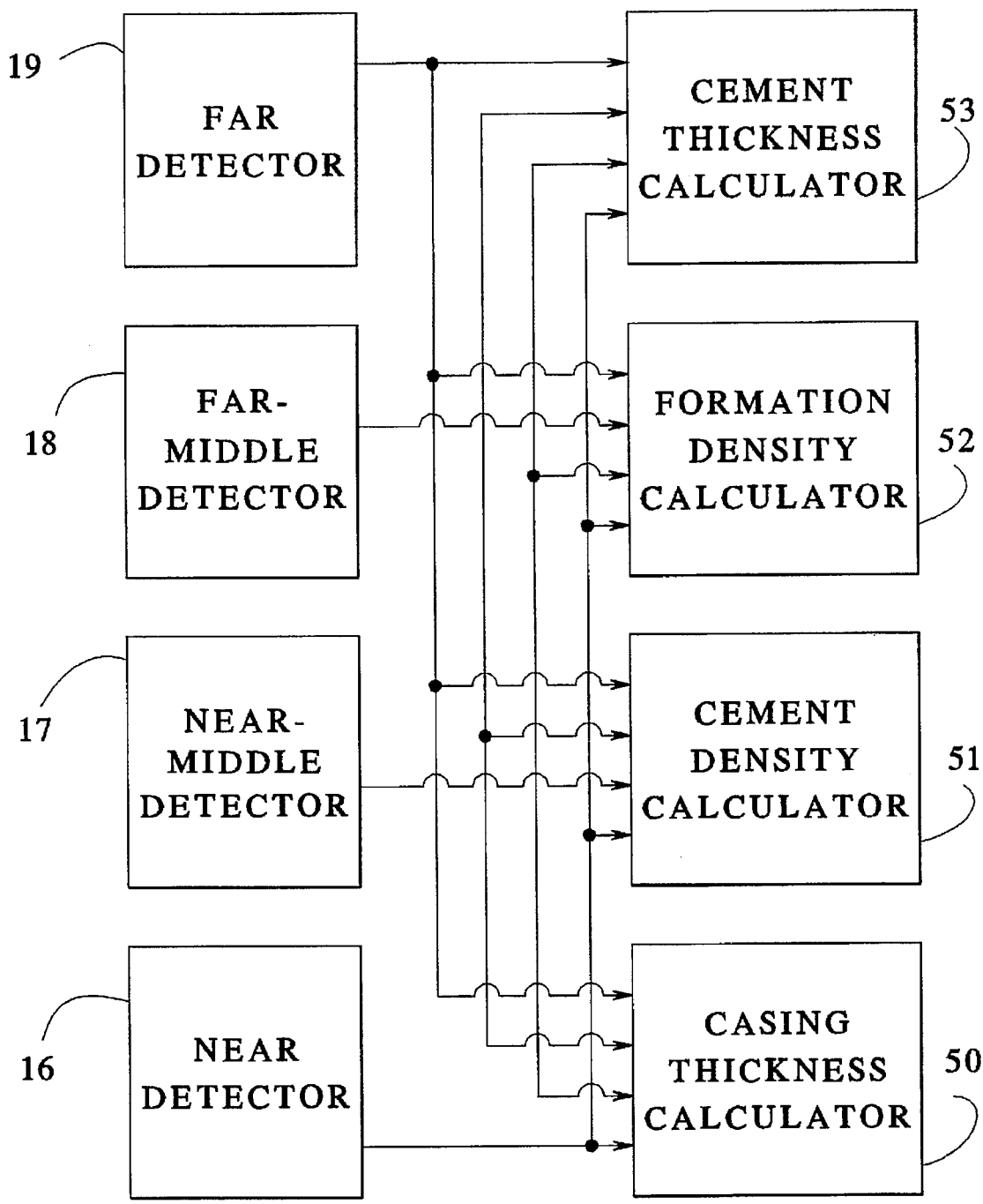
FIG. 3 is a schematic illustration of the means for calculating the casing thickness, cement density, formation density and cement thickness from the signals generated by the near, near-middle, far-middle and far detectors.

Turning to FIG. 2, a schematic diagram of the tool 10 in use is provided. The tool 10 is normally lowered to the bottom of the borehole 41 and pulled upward by a wire line. The wire line also transmits signals from the tool so that the formation density ($\rho_f$), cement thickness ($t_c$), cement density ($\rho_c$) and casing thickness ($t_s$) can be calculated as the tool 10 is pulled upward towards the surface. The tool 10 could also be designed to operate as the tool is being lowered downhole. The borehole 41 includes casing 42 having a thickness ($t_s$); the casing 42 is set within the borehole 41 with cement 43 having a thickness ($t_c$) and a density ($\rho_c$); and the formation 44 has a density ($\rho_f$). The variables $t_s$, $t_c$, $\rho_c$ and $\rho_f$ all can be measured by the tool 10. FIG. 3 is a schematic illustration of the means for calculating the casing thickness 50, cement density 51, formation density 52 and cement thickness 53.

The distances between the first detector 16, the second detector 17, the third detector 18 and the fourth detector 19 and the source 12 and geometries of the collimators 23, 27, 33, 37 must be designed so that the detector responses have different sensitivities to the formation, casing and cement.

It will also be understood that the signals generated at each detector 16, 17, 18, 19 could be divided up into various energy or "spectral" windows. For example, the gamma rays reaching any one of the detectors could be classified by its energy level and instead of one signal being generated per detector 16, 17, 18, 19, anywhere from two signals to several signals could be generated per detector depending upon the number of windows per detector.

Typical detectors, which are well known in the art, consist of scintillators coupled to photomultiplier tubes. The scintillators convert gamma rays to light and the photomultiplier converts the light to an electronic signal. The amplitude of the signal is proportional to the energy deposited in the scintillator. As is well known in the art, count rates can be generated by counting the number of times per second that a signal greater than some specified threshold is generated. Alternatively, count rates for an energy range can be generated by counting the number of times per second that a signal is detected in a specified range of amplitudes. Count rates for multiple energy ranges can be generated per detector. As is well known in the art, multiple energy ranges are used to modify the electronics to correct for drifts in signal amplitudes that are not related to the energy of the signal. This procedure, called gain stabilization, is described in the paper "A New Approach to Determining Compensated Density and $P_e$ values with a Spectral-Density Tool", presented by G. L. Moake at the Annual SPWLA Logging Symposium in Midland, Jun. 16–19, 1991. Such drifts can result from a change in the temperature or a degradation in the coupling between the scintillator and photomultiplier. In open hole logging, energy windows are also useful in analyzing lithology and in providing a more accurate mudcake correction.

Although only one specific configuration of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

What is claimed:

1. A formation-density tool comprising:

a housing, the housing accommodating a gamma ray source, at least four detectors including a near detector, a near-middle detector, a far-middle detector and a far detector;

the near detector spaced axially from the gamma ray source, the distance between the near detector and the gamma ray source is defined as a first spacing, the near detector detecting intensities of the gamma rays that engage the near detector, the near detector also generating a first signal that is proportional to the intensities of the gamma rays detected by the near detector;

the near-middle detector spaced axially from the near detector and the gamma ray source, the distance between the near-middle detector and the gamma ray source is defined as a second spacing, the near-middle detector detecting intensities of the gamma rays that engage the near-middle detector, the near-middle detector also generating a second signal that is proportional to the intensities of the gamma rays detected by the near-middle detector;

the far-middle detector spaced axially from the near detector and the gamma ray source, the distance between the far-middle detector and the gamma ray source is defined as a third spacing, the far-middle detector detecting intensities of the gamma rays that engage the far-middle detector, the far-middle detector also generating a third signal that is proportional to the intensities of the gamma rays detected by the far-middle detector; and a far detector spaced axially from the near, near-middle and far-middle detectors and the gamma ray source, the distance between the far detector and the gamma ray source is defined as a fourth spacing, the far detector detecting intensities of the gamma rays that engage the far detector, the far detector also generating a fourth signal that is proportional to the intensities of the gamma rays detected by the far detector; and means for calculating the density of the formation from the first, second, third and fourth signals.

2. The formation-density tool of claim 1, wherein the near detector is shielded by a first high density material for substantially blocking transmission of gamma rays travelling upward through the tool and through the borehole to the near detector, a first collimation channel in the first high density material extending from the near detector to an outer surface of the housing, a second collimation channel extends from the near-middle detector to the outer surface of the housing, a third collimation channel extends from the far-middle detector to the outer surface of the housing, a fourth collimation channel extends from the far detector to the outer surface of the housing.

3. The formation-density tool of claim 2, wherein the housing has a longitudinal axis, the first and second collimation channels extending toward the outer surface of the housing at an acute angle with respect to the longitudinal axis of the housing.

4. The formation-density tool of claim 1, wherein the gamma ray source is cobalt-60.

5. The formation-density tool of claim 1, wherein the gamma ray source is cesium-137.

6. The formation-density tool of claim 1, wherein the borehole is lined with casing, and cement is disposed between the casing and the borehole, the tool further comprises means for calculating cement thickness from the first, second, third and fourth signals.

7. The formation-density tool of claim 6, wherein the borehole is lined with casing, and cement is disposed between the casing and the borehole, the tool further comprises means for calculating casing thickness from the first, second, third and fourth signals.

8. The formation-density tool of claim 1, wherein the borehole is lined with casing, and cement is disposed between the casing and the borehole, the tool further comprises means for calculating the density of the cement from the first, second, third and fourth signals.

9. The formation-density tool of claim 8, wherein count rates are generated for the energy ranges of the first, second, third and fourth signals, the count rates for at least some of the energy ranges for the first, second, third and fourth signals are used for gain-stabilization of the first second, third and fourth detectors respectively.

10. The formation-density tool of claim 1, wherein the first, second, third and fourth signals are each divided into a plurality of energy ranges.

11. A formation density-tool for measuring the density of a formation surrounding a borehole that has been lined with casing, cement is disposed between the casing and the borehole, the tool comprising:

a housing for enclosing the tool and protecting the tool from the environment, the housing having a longitudinal axis, the housing accommodating a gamma ray source, a near detector spaced axially from the gamma ray source by a first spacing distance, a near-middle detector spaced axially from the gamma ray source by a second spacing distance, a far-middle detector spaced axially from the gamma ray source by a third spacing distance and a far detector spaced axially from the gamma ray source by a fourth spacing distance;

the near detector is shielded by a first high density material for substantially blocking transmission of gamma rays emitted from the gamma ray source to the near detector, a first collimation channel in the first high density material extending from the near detector to an outer surface of the housing, the first collimation channel permitting gamma rays scattered primarily from the casing to reach the near detector, the near detector generating a first signal that is proportional to the intensity of the gamma rays reaching the near detector;

a near-middle detector disposed farther from the source than the near detector, a second collimation channel extends from the near-middle detector to the outer surface of the housing at an acute angle from the longitudinal axis of the housing, the second collimation channel permitting gamma rays scattered primarily from the casing and the cement to reach the near-middle detector, the near-middle detector generating a second signal that is proportional to the intensity of the gamma rays reaching the near-middle detector;

a far-middle detector disposed farther from the source than the near and near-middle detectors, a third collimation channel extends from the far-middle detector to the outer surface of the housing, the third collimation channel permitting gamma rays scattered primarily from the casing, cement and formation to reach the far-middle detector, the far-middle detector generating a third signal that is proportional to the intensity of the gamma rays reaching the far-middle detector;

a far detector disposed farther from the source than the near, near-middle and far-middle detectors, a fourth collimation channel extends from the far detector to the outer surface of the housing, the fourth collimation channel permitting gamma rays scattered primarily from the casing, cement and formation to reach the far detector, the far detector generating a fourth signal that is proportional to the intensity of the gamma rays reaching the far detector;

the first, second, third and fourth collimation channels are in substantial alignment along the outer surface of the housing; and means for generating the density of the formation, the thickness of the cement, the density of the cement and the thickness of the casing from the first, second, third and fourth signals.

12. The formation-density tool of claim 11, wherein the gamma ray source is cobalt-60.

13. The formation-density tool of claim 11, wherein the gamma ray source is cesium-137.

14. An formation-density tool for measuring the density of a formation surrounding a borehole that has been lined with casing, cement is disposed between the casing and the borehole, the tool comprising:

a first detection means spaced axially from a gamma ray emission means, the distance between the first detection means and the gamma ray emission means is defined as a first spacing, the first detection means primarily detecting gamma rays scattered from the casing, the first detection means generating a first signal that is proportional to the intensity of gamma rays detected by the first detection means;

a second detection means spaced axially farther from the gamma ray emission means than the first detection means, the distance between the second detection means and the gamma ray emission means is defined as a second spacing, the second detection means primarily detecting gamma rays scattered from the casing and the cement, the second detection means generating a second signal that is proportional to the intensity of gamma rays detected by the second detection means;

a third detection means spaced axially farther from the gamma ray emission means than the first and second detection means, the distance between the third detection means and the gamma ray emission means is defined as a third spacing, the third detection means primarily detecting gamma rays scattered from the casing, the cement and formation, the third detection means generating a third signal that is proportional to the intensity of gamma rays detected by the third detection means;

a fourth detection means spaced axially farther from the gamma ray emission means than both the first, second and third detection means, the distance between the fourth detection means and the gamma ray emission means is defined as a fourth spacing, the fourth detection means primarily detecting gamma rays scattered from the casing, cement and formation, the fourth detection means generating a fourth signal that is proportional to the intensity of gamma rays detected by the fourth detection means; and means for calculating the formation density from the first, second, third and fourth signals.

15. The formation-density tool of claim 14, further comprising means for generating the thickness of the cement, the density of the cement and the thickness of the casing from the first, second, third and fourth signals.

16. A method of measuring the density of a formation surrounding a borehole that has been lined with casing, cement is disposed between the casing and the borehole, the method comprising the following steps:

irradiating the casing, cement and formation with gamma rays emitted from a gamma ray source;

detecting gamma rays scattered primarily from the casing at a first spaced distance above the gamma ray source;

generating a first signal at the first spaced distance;

detecting gamma rays scattered primarily from the casing and cement at a second spaced distance above the gamma ray source, the second spaced distance being above the first spaced distance;

generating a second signal at the second spaced distance;

detecting gamma rays scattered primarily from the casing, cement and formation at a third spaced distance above the gamma ray source, the third spaced distance being above the second spaced distance;

generating a third signal at the third spaced distance;

detecting gamma rays scattered primarily from the casing, cement and formation at a fourth spaced distance above the gamma ray source, the fourth spaced distance being above the third spaced distance;

generating a fourth signal at the fourth spaced distance;

calculating an estimated formation density from the first, second, third and fourth signals and by assuming constant values for the density and $P_e$ of the casing, by assuming negligible values for the $P_e$ of the cement and the $P_e$ of the formation, and by using a correction for the borehole fluid, where $P_e$ is the strength or effect of the coherent scattering and photoelectric absorption interactions relative to the strength of the Compton scattering.

17. A method of measuring the thickness of casing disposed in a borehole, at least some cement being disposed between the casing and the borehole, the method comprising the following steps:

irradiating the casing, cement and formation with gamma rays emitted from a gamma ray source;

detecting gamma rays scattered primarily from the casing at a first spaced distance above the gamma ray source;

generating a first signal at the first spaced distance;

detecting gamma rays scattered primarily from the casing and cement at a second spaced distance above the gamma ray source, the second spaced distance being above the first spaced distance;

generating a second signal at the second spaced distance;

detecting gamma rays scattered primarily from the casing, cement and formation at a third spaced distance above the gamma ray source, the third spaced distance being above the second spaced distance;

generating a third signal at the third spaced distance;

detecting gamma rays scattered primarily from the casing, cement and formation at a fourth spaced distance above the gamma ray source, the fourth spaced distance being above the third spaced distance;

generating a fourth signal at the fourth spaced distance;

calculating an estimated casing thickness from the first, second, third and fourth signals and by assuming constant values for the density and $P_e$ of the casing, by assuming negligible values for the $P_e$ of the cement and the $P_e$ of the formation, and by using a correction for the borehole fluid, where $P_e$ is the strength or effect of the coherent scattering and photoelectric absorption interactions relative to the strength of the Compton scattering.

18. A method of measuring the thickness of cement disposed behind casing that lines a borehole, the method comprising the following steps:

irradiating the casing, cement and formation with gamma rays emitted from a gamma ray source;

detecting gamma rays scattered primarily from the casing at a first spaced distance above the gamma ray source;

generating a first signal at the first spaced distance;

detecting gamma rays scattered primarily from the casing and cement at a second spaced distance above the gamma ray source, the second spaced distance being above the first spaced distance;

generating a second signal at the second spaced distance;

detecting gamma rays scattered primarily from the casing, cement and formation at a third spaced distance above the gamma ray source, the third spaced distance being above the second spaced distance;

generating a third signal at the third spaced distance;

detecting gamma rays scattered primarily from the casing, cement and formation at a fourth spaced distance above the gamma ray source, the fourth spaced distance being above the third spaced distance;

generating a fourth signal at the fourth spaced distance;

calculating an estimated cement thickness from the first, second, third and fourth signals and by assuming constant values for the density and $P_e$ of the casing, by assuming negligible values for the $P_e$ of the cement and the $P_e$ of the formation, and by using a correction for the borehole fluid, where $P_e$ is the strength or effect of the coherent scattering and photoelectric absorption interactions relative to the strength of the Compton scattering.

19. A method of measuring the density of cement disposed behind casing that lines a borehole, the method comprising the following steps:

irradiating the casing, cement and formation with gamma rays emitted from a gamma ray source;

detecting gamma rays scattered primarily from the casing at a first spaced distance above the gamma ray source;

generating a first signal at the first spaced distance;

detecting gamma rays scattered primarily from the casing and cement at a second spaced distance above the gamma ray source, the second spaced distance being above the first spaced distance;

generating a second signal at the second spaced distance;

detecting gamma rays scattered primarily from the casing, cement and formation at a third spaced distance above the gamma ray source, the third spaced distance being above the second spaced distance;

generating a third signal at the third spaced distance;

detecting gamma rays scattered primarily from the casing, cement and formation at a fourth spaced distance above the gamma ray source, the fourth spaced distance being above the third spaced distance;

generating a fourth signal at the fourth spaced distance;

calculating an estimated cement density from the first, second, third and fourth signals and by assuming constant values for the density and $P_e$ of the casing, by assuming negligible values for the $P_e$ of the cement and the $P_e$ of the formation, and by using a correction for the borehole fluid, where $P_e$ is the strength or effect of the coherent scattering and photoelectric absorption interactions relative to the strength of the Compton scattering.

20. A method of measuring the thickness of cement and the thickness of casing in a borehole with a formation-density tool and using said cement thickness and casing thickness to enhance the porosity measurement of a neutron-porosity tool, the method comprising the following steps:

irradiating the casing, cement and formation with gamma rays emitted from a gamma ray source disposed in the formation-density tool;

detecting gamma rays scattered primarily from the casing at a first spaced distance above the gamma ray source;

generating a first signal at the first spaced distance;

detecting gamma rays scattered primarily from the casing and cement at a second spaced distance above the gamma ray source, the second spaced distance being above the first spaced distance;

generating a second signal at the second spaced distance;

detecting gamma rays scattered primarily from the casing, cement and formation at a third spaced distance above the gamma ray source, the third spaced distance being above the second spaced distance;

generating a third signal at the third spaced distance;

detecting gamma rays scattered primarily from the casing, cement and formation at a fourth spaced distance above the gamma ray source, the fourth spaced distance being above the third spaced distance;

generating a fourth signal at the fourth spaced distance;

calculating an estimated casing thickness and cement thickness from the first, second, third and fourth signals and by assuming constant values for the density and $P_e$ of the casing, by assuming negligible values for the $P_e$ of the cement and the $P_e$ of the formation, and by using a correction for the borehole fluid, where $P_e$ is the strength or effect of the coherent scattering and photoelectric absorption interactions relative to the strength of the Compton scattering;

calculating a borehole diameter from the casing diameter, casing thickness and cement thickness;

irradiating the formation with neutrons emitted from a neutron source disposed in the neutron-porosity tool;

detecting neutrons that have passed through the formation at one or more neutron detectors;

calculating formation porosity based on the rate at which neutrons are detected at each of said neutron detectors, the borehole diameter, the casing thickness and the cement thickness.

21. A tool for measuring the density of a formation, the tool comprising:

a near detector spaced axially from a gamma ray source, the near detector detecting intensities of the gamma rays that engage the near detector and generating a first signal that is proportional to the intensities of the gamma rays detected by the near detector;

a near-middle detector spaced axially from the near detector and the gamma ray source, the near-middle detector detecting intensities of the gamma rays that engage the near-middle detector and generating a second signal that is proportional to the intensities of the gamma rays detected by the near-middle detector;

a far-middle detector spaced axially from the near-middle detector, near detector and the gamma ray source, the far-middle detector detecting intensities of the gamma rays that engage the far-middle detector and generating a third signal that is proportional to the intensities of the gamma rays detected by the far-middle detector; and a far detector spaced axially from the near, near-middle and far-middle detectors and the gamma ray source, the far detector detecting intensities of the gamma rays that engage the far detector and generating a fourth signal that is proportional to the intensities of the gamma rays detected by the far detector; and means for calculating the density of the formation from the first, second, third and fourth signals.

22. A tool for measuring the thickness of casing disposed in a borehole, the tool comprising:

a near detector spaced axially from a gamma ray source, the near detector detecting intensities of the gamma rays that engage the near detector and generating a first signal that is proportional to the intensities of the gamma rays detected by the near detector;

a near-middle detector spaced axially from the near detector and the gamma ray source, the near-middle detector detecting intensities of the gamma rays that engage the near-middle detector and generating a second signal that is proportional to the intensities of the gamma rays detected by the near-middle detector;

a far-middle detector spaced axially from the near-middle detector, near detector and the gamma ray source, the far-middle detector detecting intensities of the gamma rays that engage the far-middle detector and generating a third signal that is proportional to the intensities of the gamma rays detected by the far-middle detector; and a far detector spaced axially from the near, near-middle and far-middle detectors and the gamma ray source, the far detector detecting intensities of the gamma rays that engage the far detector and generating a fourth signal that is proportional to the intensities of the gamma rays detected by the far detector; and means for calculating the thickness of the casing from the first, second, third and fourth signals.

23. A tool for measuring the thickness of cement disposed between casing and a borehole, the tool comprising:

a near detector spaced axially from a gamma ray source, the near detector detecting intensities of the gamma rays that engage the near detector and generating a first signal that is proportional to the intensities of the gamma rays detected by the near detector;

a near-middle detector spaced axially from the near detector and the gamma ray source, the near-middle detector detecting intensities of the gamma rays that engage the near-middle detector and generating a second signal that is proportional to the intensities of the gamma rays detected by the near-middle detector;

a far-middle detector spaced axially from the near-middle detector, near detector and the gamma ray source, the far-middle detector detecting intensities of the gamma rays that engage the far-middle detector and generating a third signal that is proportional to the intensities of the gamma rays detected by the far-middle detector; and a far detector spaced axially from the near, near-middle and far-middle detectors and the gamma ray source, the far detector detecting intensities of the gamma rays that engage the far detector and generating a fourth signal that is proportional to the intensities of the gamma rays detected by the far detector; and means for calculating the thickness of the cement from the first, second, third and fourth signals.

24. A tool for measuring the density of cement disposed between casing and a borehole, the tool comprising:

a near detector spaced axially from a gamma ray source, the near detector detecting intensities of the gamma rays that engage the near detector and generating a first signal that is proportional to the intensities of the gamma rays detected by the near detector;

a near-middle detector spaced axially from the near detector and the gamma ray source, the near-middle detector detecting intensities of the gamma rays that engage the near-middle detector and generating a second signal that is proportional to the intensities of the gamma rays detected by the near-middle detector;

a far-middle detector spaced axially from the near-middle detector, near detector and the gamma ray source, the far-middle detector detecting intensities of the gamma rays that engage the far-middle detector and generating a third signal that is proportional to the intensities of the gamma rays detected by the far-middle detector; and a far detector spaced axially from the near, near-middle and far-middle detectors and the gamma ray source, the far detector detecting intensities of the gamma rays that engage the far detector and generating a fourth signal that is proportional to the intensities of the gamma rays detected by the far detector; and means for calculating the density of the cement from the first, second, third and fourth signals.

25. A method of measuring the density of a formation surrounding a borehole that has been lined with casing, a medium selected from the group comprising cement, water and a combination of cement and water being disposed between the casing and the borehole, the method comprising the following steps:

irradiating the casing, medium and formation with gamma rays emitted from a gamma ray source;

detecting gamma rays scattered primarily from the casing at a first spaced distance above the gamma ray source;

generating a first signal at the first spaced distance;

detecting gamma rays scattered primarily from the casing and medium at a second spaced distance above the gamma ray source, the second spaced distance being above the first spaced distance;

generating a second signal at the second spaced distance;

detecting gamma rays scattered primarily from the casing, medium and formation at a third spaced distance above the gamma ray source, the third spaced distance being above the second spaced distance;

generating a third signal at the third spaced distance;

detecting gamma rays scattered primarily from the casing, medium and formation at a fourth spaced distance above the gamma ray source, the fourth spaced distance being above the third spaced distance;

generating a fourth signal at the fourth spaced distance;

calculating an estimated formation density from the first, second, third and fourth signals.

26. A method of measuring the thickness of casing disposed in a borehole, a medium selected from the group consisting of cement, water and a combination of cement and water being disposed between the casing and the borehole, the method comprising the following steps:

irradiating the casing, medium and formation with gamma rays emitted from a gamma ray source;

detecting gamma rays scattered primarily from the casing at a first spaced distance above the gamma ray source;

generating a first signal at the first spaced distance;

detecting gamma rays scattered primarily from the casing and medium at a second spaced distance above the gamma ray source, the second spaced distance being above the first spaced distance;

generating a second signal at the second spaced distance;

detecting gamma rays scattered primarily from the casing, medium and formation at a third spaced distance above the gamma ray source, the third spaced distance being above the second spaced distance;

generating a third signal at the third spaced distance;

detecting gamma rays scattered primarily from the casing, medium and formation at a fourth spaced distance above the gamma ray source, the fourth spaced distance being above the third spaced distance;

generating a fourth signal at the fourth spaced distance;

calculating an estimated casing thickness from the first, second, third and fourth signals.

27. A method of measuring the thickness of cement disposed behind casing that lines a borehole, the method comprising the following steps:

irradiating the casing, cement and formation with gamma rays emitted from a gamma ray source;

detecting gamma rays scattered primarily from the casing at a first spaced distance above the gamma ray source;

generating a first signal at the first spaced distance;

detecting gamma rays scattered primarily from the casing and cement at a second spaced distance above the gamma ray source, the second spaced distance being above the first spaced distance;

generating a second signal at the second spaced distance;

detecting gamma rays scattered primarily from the casing, cement and formation at a third spaced distance above the gamma ray source, the third spaced distance being above the second spaced distance;

generating a third signal at the third spaced distance;

detecting gamma rays scattered primarily from the casing, cement and formation at a fourth spaced distance above the gamma ray source, the fourth spaced distance being above the third spaced distance;

generating a fourth signal at the fourth spaced distance;

calculating an estimated cement thickness from the first, second, third and fourth signals.

28. A method of measuring the density of cement disposed behind casing that lines a borehole, the method comprising the following steps:

irradiating the casing, cement and formation with gamma rays emitted from a gamma ray source;

detecting gamma rays scattered primarily from the casing at a first spaced distance above the gamma ray source;

generating a first signal at the first spaced distance;

detecting gamma rays scattered primarily from the casing and cement at a second spaced distance above the gamma ray source, the second spaced distance being above the first spaced distance;

generating a second signal at the second spaced distance;

detecting gamma rays scattered primarily from the casing, cement and formation at a third spaced distance above the gamma ray source, the third spaced distance being above the second spaced distance;

generating a third signal at the third spaced distance;

detecting gamma rays scattered primarily from the casing, cement and formation at a fourth spaced distance above the gamma ray source, the fourth spaced distance being above the third spaced distance;

generating a fourth signal at the fourth spaced distance;

calculating an estimated cement density from the first, second, third and fourth signals.

29. A method of measuring the thickness of cement and the thickness of casing in a borehole with a formation-density tool and using said cement thickness and casing thickness to enhance the porosity measurement of a neutron-porosity tool, the method comprising the following steps:

irradiating the casing, cement and formation with gamma rays emitted from a gamma ray source disposed in the formation-density tool;

detecting gamma rays scattered primarily from the casing at a first spaced distance above the gamma ray source;

generating a first signal at the first spaced distance;

detecting gamma rays scattered primarily from the casing and cement at a second spaced distance above the gamma ray source, the second spaced distance being above the first spaced distance;

generating a second signal at the second spaced distance;

detecting gamma rays scattered primarily from the casing, cement and formation at a third spaced distance above the gamma ray source, the third spaced distance being above the second spaced distance;

generating a third signal at the third spaced distance;

detecting gamma rays scattered primarily from the casing, cement and formation at a fourth spaced distance above the gamma ray source, the fourth spaced distance being above the third spaced distance;

generating a fourth signal at the fourth spaced distance;

calculating an estimated casing thickness and cement thickness from the first, second, third and fourth signals;

calculating a borehole diameter from the casing diameter, casing thickness and cement thickness;

irradiating the formation with neutrons emitted from a neutron source disposed in the neutron-porosity tool;

detecting neutrons that have passed through the formation at one or more neutron detectors;

calculating formation porosity based on the rate at which neutrons are detected at each of said neutron detectors, the borehole diameter, the casing thickness and the cement thickness.

* * * * *